(12) United States Patent
Wang

(10) Patent No.: US 7,920,846 B2
(45) Date of Patent: Apr. 5, 2011

(54) METHOD FOR IMPLEMENTING ACCESS RESTRICTION OF MOBILE NETWORKS

(75) Inventor: Jie Wang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 911 days.

(21) Appl. No.: 10/591,739

(22) PCT Filed: Mar. 18, 2005

(86) PCT No.: PCT/CN2005/000336
§ 371 (c)(1),
(2), (4) Date: Jun. 4, 2007

(87) PCT Pub. No.: WO2005/091660
PCT Pub. Date: Sep. 29, 2005

(65) Prior Publication Data
US 2007/0287419 A1    Dec. 13, 2007

(30) Foreign Application Priority Data

Mar. 19, 2004   (CN) .......................... 2004 1 0029476

(51) Int. Cl.
H04M 1/66  (2006.01)
(52) U.S. Cl. .......................... 455/411; 370/349; 455/436
(58) Field of Classification Search .................. 455/411, 455/436, 433; 370/349
See application file for complete search history.

(56) References Cited

U.S. PATENT DOCUMENTS

| | | | |
|---|---|---|---|
| 5,884,168 A | 3/1999 | Kolev et al. | |
| 6,992,993 B1 * | 1/2006 | Park et al. | 370/328 |
| 7,062,270 B1 * | 6/2006 | Dalvie et al. | 455/433 |
| 7,623,504 B2 * | 11/2009 | Phu | 370/349 |
| 2004/0029587 A1 * | 2/2004 | Hulkkonen et al. | 455/436 |

FOREIGN PATENT DOCUMENTS

| | | |
|---|---|---|
| FI | 946089 A | 6/1996 |
| JP | 2002-132976 A | 5/2002 |
| KR | 2001-0097856 A | 11/2001 |

(Continued)

OTHER PUBLICATIONS

English Transalation of the Written Opinion of the International Searching Authority, International application No. PCT/CN2005/000336, Date of mailing Jun. 9, 2005, 3 pages.

(Continued)

*Primary Examiner* — Phuoc Doan
(74) *Attorney, Agent, or Firm* — Slater & Matsil, L.L.P.

(57) ABSTRACT

The present invention discloses a method for implementing access restriction of mobile networks. The method includes the following steps: a Mobile Station (MS) inquiring a list of forbidden Public Land Mobile Networks (PLMNs) and access technology identifiers, which is saved by itself, when selecting a PLMN network; the MS determining whether the selected PLMN network and the access technology exist in the list of forbidden PLMNs and access technology identifiers, if they exist, the MS will not send a Location Updating Request to a Mobile Switching Center/Serving GPRS Support Node (MSC/SGSN); otherwise, the MS will send the Location Updating Request to the MSC/SGSN in order to access to the network. The present invention makes it possible to implement the access restrictions upon different types of access networks using different restriction rules. Furthermore, during the process of implementing the access restriction, the modification to the existing networks and user terminals is very small, the method is easy to implement and can well satisfy demands on the access restriction of operators.

14 Claims, 3 Drawing Sheets

FOREIGN PATENT DOCUMENTS

| | | |
|---|---|---|
| WO | WO 02/069660 | 9/2002 |
| WO | WO 02/069660 A1 | 9/2002 |

OTHER PUBLICATIONS

Chinese Office Action, Application No. 2004100294764, dated Oct. 9, 2009, 9 pages.

"3$^{rd}$ Generation Partnership Project; Technical Specification Group Core Network; NAS Functions related to Mobile Station (MS) in idle mode (Release 5)," 3GPP TS 23.122 V5.3.0, Sep. 2003, 33 pages.

"3$^{rd}$ Generation Partnership Project; Technical Specification Group Services and System Aspects; Service accessibility (Release 6)," 3GPP TS 22.011 V6.2.0, Jan. 2004, 17 pages.

* cited by examiner

Byte5n-1:

Byte 5n:

METHOD FOR IMPLEMENTING ACCESS RESTRICTION OF MOBILE NETWORKS

CROSS-REFERENCE TO RELATED APPLICATIONS

This is a National Stage of International Application No. PCT/CN2005/000336, filed on Mar. 18, 2005, published as WO 2005/091660, published date Sep. 29, 2005, which designated the United States; which claims priority of Chinese Patent Application No. 200410029476.4, filed Mar. 19, 2004, the disclosure of each application is hereby incorporated by reference in their entirety.

FIELD OF THE TECHNOLOGY

The present invention relates to mobile communication technologies. More particularly, the invention relates to a method for implementing access restriction of mobile networks.

BACKGROUND OF THE INVENTION

Nowadays, in the Global System of Mobile (GSM) network, mobile subscribers are able to roam among GSM networks of different operators, and the GSM networks can also implement access restriction to the mobile subscribers. Methods for implementing the access restriction in the GSM networks are very mature. One of the methods can obtain a Public Land Mobile Network (PLMN) number of a home GSM network of the subscriber by analyzing User Identifiers such as International Mobile Subscriber Identity (IMSI) or Mobile Station Integrated Services Digital Network (MSISDN) number. Since different operators have different PLMN numbers of their networks, this method can determine and obtain the home GSM network of the subscriber by the obtained PLMN number, accordingly, the corresponding access restriction can be implemented to the subscriber according to the home GSM network of the subscriber. A detailed implementation procedure includes:

If no roaming permission contract is subscribed between GSM networks of two operators, when a Mobile Station (MS) of a first GSM network roams into a second GSM network, the MS will initiate a Location Registration Request to the second GSM network. The second GSM network obtains the PLMN number of the home network of the MS by analyzing the user identifier of the MS, and then determines that the home GSM network of the MS is the first GSM network. Therefore, the second GSM network returns a Location Registration Reject Message, with a reason value of "the PLMN number is not permitted" to the MS. The MS writes the PLMN number in the reason value of the message in a list of "PLMN forbidden to access" in the Subscriber Identity Module (SIM) of the MS after receiving the reject message, wherein the list will still be saved in the SIM card when the MS is shut down or the SIM card is taken out of the MS; the MS can implement access restrictions by the list of "PLMN forbidden to access". When the MS operates in a automatic PLMN network selection mode, if the PLMN number of the selected network is in the list of "PLMN forbidden to access", the MS will not initiate the Location Register Request to the GSM network corresponding to the PLMN number, thereby the access restriction is implemented automatically; when the MS operates in a manual PLMN network selection mode, if the MS successfully accesses to a certain PLMN network, the MS will determine whether the PLMN number of the network exists in the list of "PLMN forbidden to access", if it exists, the PLMN number will be deleted from the list of "PLMN forbidden to access", so that the MS is able to initiate the Location Register Request to the PLMN network in the automatic PLMN network selection mode. By the list of "PLMN forbidden to access", the method can automatically forbid the MS to initiate the Location Register Request to the PLMN network which is forbidden to access, so the demand for access restriction is satisfied.

However, with the emergence of the $3^{rd}$ Generation (3G) networks, such as Wideband Code Division Multiple Access (WCDMA), the above-mentioned method cannot satisfy the demand of access restriction. For instance, some operators may simultaneously have a GSM network and a WCDMA network, and the GSM network and the WCDMA network can respectively have their own PLMN numbers or share the same PLMN number. If they share one PLMN number, the GSM network and the WCDMA network cannot be differentiated according to the PLMN number, therefore it is impossible to implement the access restriction of the GSM network or the WCDMA network. Similarly, as for networks of other types, the above-mentioned problem still exists.

SUMMARY OF THE INVENTION

In view of the above, the present invention is to provide a method for implementing access restriction of mobile networks; the method can differentiate types of networks sharing one Public Land Mobile Network (PLMN) number and implement access restriction upon the networks of different types.

The present invention provides a method for implementing access restriction of mobile networks, and the method includes the steps of:

a Mobile Station (MS) inquiries a list of forbidden PLMNs and access technology identifiers, which is saved by the MS, when selecting the PLMN network;

the MS determines whether the selected PLMN network and the access technology exist in the list of forbidden PLMNs and access technology identifiers, if they exist, the MS will not send a Location Updating Request to a Mobile Switching Center/Serving GPRS Support Node (MSC/SGSN) of a Core Network; otherwise, the MS will send the Location Updating Request to the MSC/SGSN in order to access to the network.

It can be seen that, access restriction is implemented with the information in the list of forbidden PLMNs and access technology identifiers stored in the Subscriber Identity Module/Universal Mobile Telecommunication System SIM (SIM/USIM), thereby the requirements of network access restriction upon various access technologies are satisfied. The present invention makes it possible to implement the access restrictions upon different types of access networks by using different restriction rules. Furthermore, during the process of implementing the access restriction, the modification to the existing networks and user terminals is small, thus the method is easy to implement and can satisfy demands on access restriction of the operators.

DETAILED DESCRIPTION OF THE INVENTION

A method for implementing the access restriction of mobile networks is provided. Access technology identifiers are added in the list of "PLMN forbidden to access", and the access restriction is implemented by using the PLMN numbers and the access technology identifiers in the list, therefore satisfying the demand of the access restriction upon different types of networks.

The embodiments of the present invention will be described in detail hereinafter with reference to the accompanying drawings.

Figure 1:
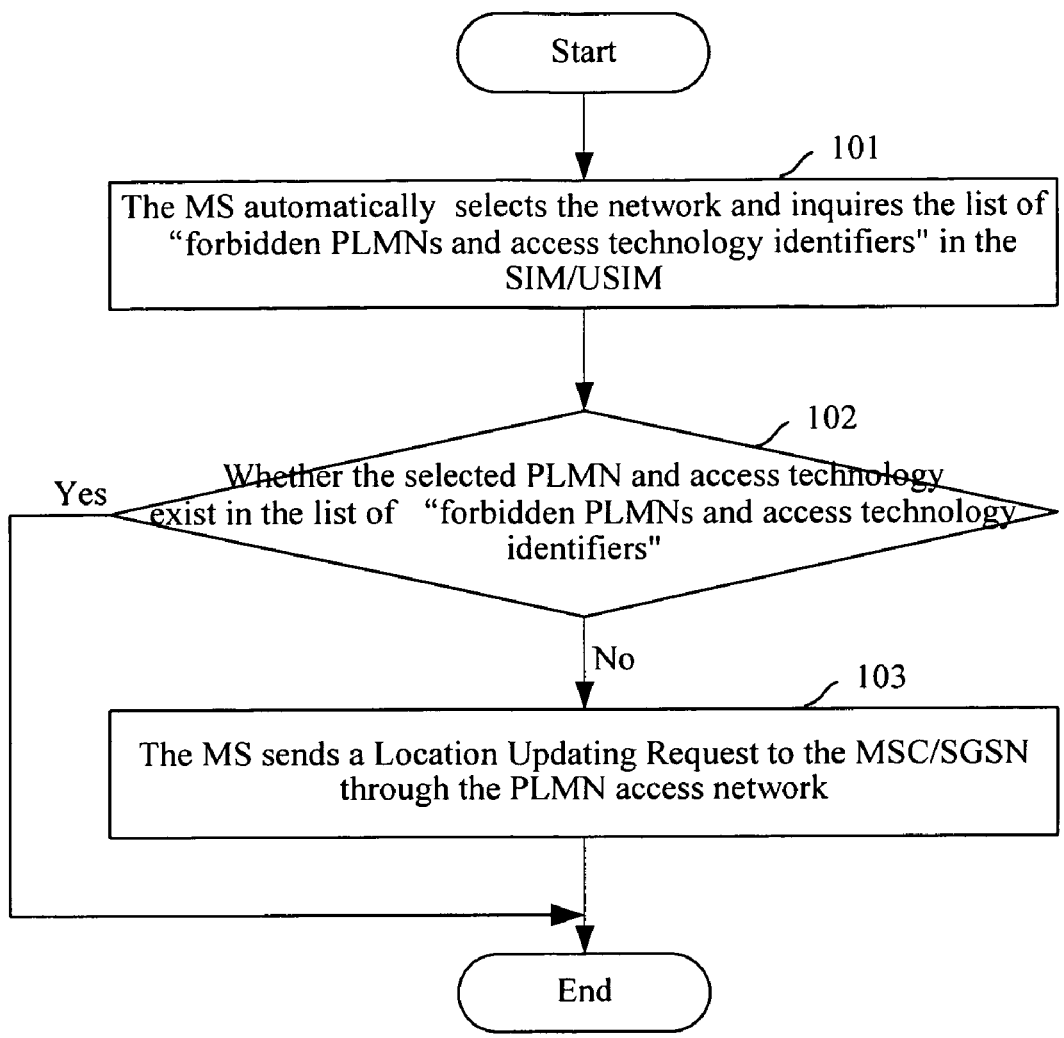
FIG. 1 is a flow chart for implementing an embodiment of the present invention.

As shown in FIG. 1, an embodiment of the present invention is implemented through the following steps when the MS selects to access a PLMN access network:

Step 101: the MS inquires about the list of forbidden PLMNs and access technology identifiers, which is saved in the SIM/USIM of the MS, when entering an automatic PLMN network selection mode.

Step 102: the MS determines whether the automatically selected PLMN network and the access technology exist in the list of forbidden PLMNs and access technology identifiers. If they exist, it represents that the selected PLMN access network is forbidden to access, then the MS will not send a Location Updating Request to an Mobile Switching Center/Serving GPRS Support Node (MSC/SGSN) of the Core Network, and ends the procedure; otherwise, it represents that the selected PLMN access network is allowed to access, executing step 103;

Step 103: the MS sends the Location Updating Request to the MSC/SGSN through the selected PLMN access network, and accomplishes the roaming of the MS.

Figure 2:
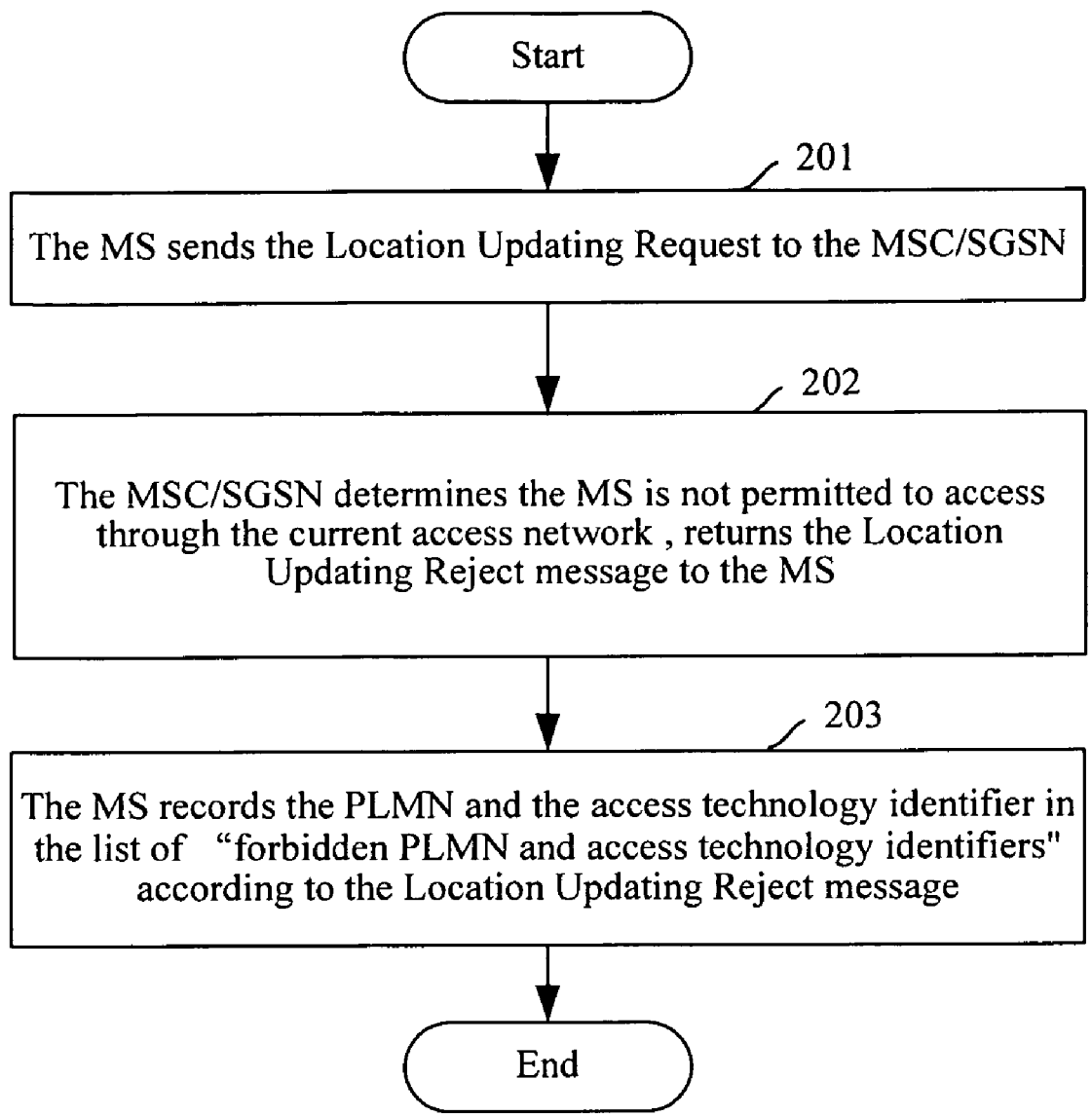
FIG. 2 is a flow chart illustrating the procedure of generating the list of forbidden PLMNs and access technology identifiers.

In an embodiment of the present invention, as shown in FIG. 2, the list of forbidden PLMNs and access technology identifiers mentioned in step 101 and step 102 is generated through the following steps:

Step 201: the MS sends the Location Updating Request to the MSC/SGSN through the access network;

Step 202: if the MSC/SGSN determines not to permit the subscriber to access the network through the current access network, it returns a Location Updating Reject Message to the MS, with the reason value in the Location Updating Reject message. The reason value can be one of the "PLMN not permitted" and the "PLMN current access technology not permitted" according to different location updating rejection reasons. The reason value of "PLMN current access technology not permitted" is a newly-added reason value in the Location Updating Reject Message for implementing the embodiment of the present invention;

Step 203: the MS records the PLMN number of the access network and the access technology identifier which are forbidden to access in the list of forbidden PLMNs and access technology identifiers, which is stored in the SIM/USIM of the MS, according to the reason value in the Location Updating Reject message. The list of forbidden PLMNs and access technology identifiers is an expanded list from the list of "PLMN forbidden to access" in the prior art, Table 1 is an embodiment for implementing the list.

TABLE 1

| 1 to 3 | 1st PLMN | 3 bytes |
|---|---|---|
| 4 to 5 | 1st PLMN Access technology identifier | 2 bytes |
| 6 to 8 | 2nd PLMN | 3 bytes |
| 9 to 10 | 2nd PLMN Access technology identifier | 2 bytes |
| . | . | |
| . | . | |
| . | . | |
| (5n − 4) to (5n − 2) | Nth PLMN | 3 bytes |
| (5n − 1) to 5n | Nth PLMN Access technology identifier | 2 bytes |

Figure 3:
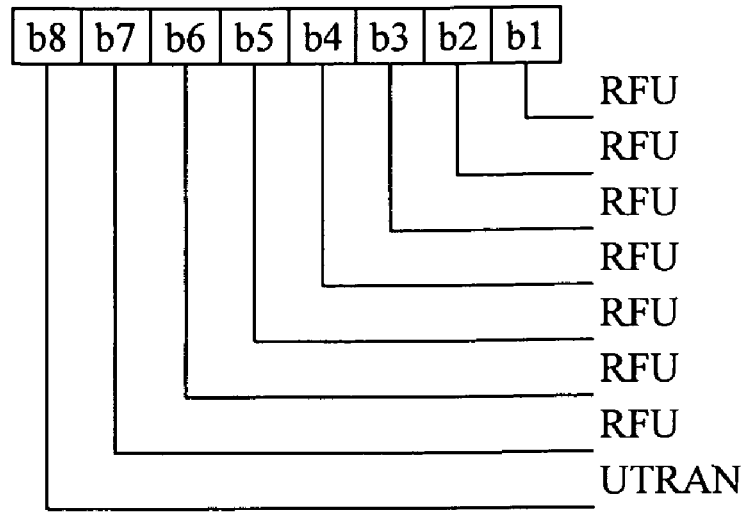
FIG. 3 is a schematic diagram illustrating the 5n-1st byte of the access restriction rule data in an embodiment of the present invention.
Figure 4:
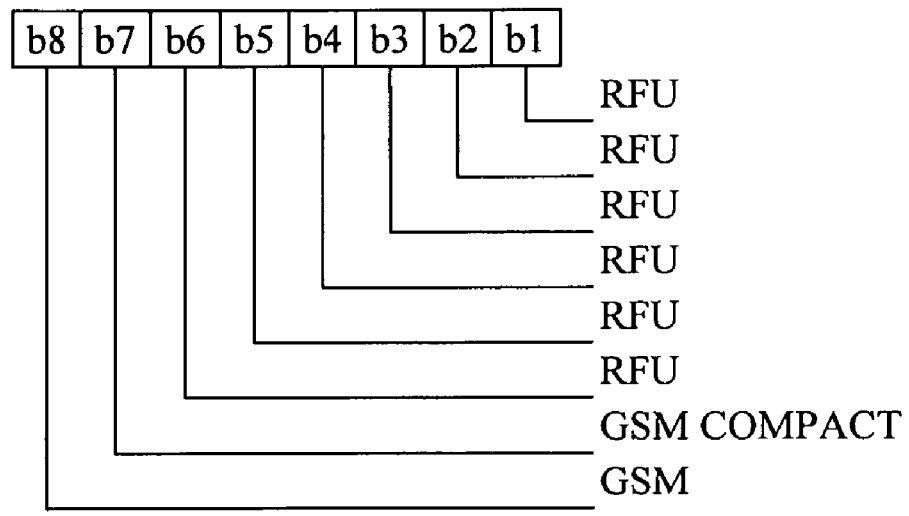
FIG. 4 is a schematic diagram illustrating the 5 nth byte of the access restriction rule data in an embodiment of the present invention.

Referring to Table 1, which includes the PLMN numbers and the access technology identifiers, one PLMN number and one corresponding access technology identifier form one group of access restriction rule data in the list express one PLMN number and its access technology forbidden to access. The list includes at least one group of access restriction rule data, wherein, each group of the access restriction rule data occupies five bytes. Each the first three bytes is used for storing the PLMN number. Each the forth and the fifth bytes is respectively used for storing the access technology identifier. In each byte used for storing technology identifiers, each of the 8 bits of each byte represents one kind of access technology, and the bit value 0 represents the access technology is permitted to access; while the bit value 1 represents the access technology is forbidden to access. As shown in FIG. 3 and FIG. 4, taking the 5n-1 st byte and the 5 nth byte shown in Table 1 as example, in the implementation of the 5n-1st byte shown in FIG. 3, the 8th bit of this byte represents a UMTS Terrestrial Radio Access Network (UTRAN) (WCDMA wireless access technology), and if this bit is 1, it indicates that the WCDMA wireless access technology is a forbidden access technology; if this bit is 0, it indicates that the WCDMA wireless access technology is a permitted access technology; the other 7 bits of this byte are RFU, reserved for future access technologies. in the implementation of the 5 nth byte shown in FIG. 4, the 8th bit of this byte represents the GSM wireless access technology, if this bit is 1, it indicates that the GSM wireless access technology is a forbidden access technology, and if this bit is 0, it indicates that GSM wireless access technology is a permitted access technology; the 7th bit of this byte represents a GSM COMPACT wireless access technology, if this bit is 1, it indicates that the GSM COMPACT wireless access technology is a forbidden access technology, if this bit is 0, it indicates that the GSM COMPACT wireless access technology is a permitted access technology; the other 6 bits are RFU, reserved for future access technologies;

In Step 203, the step of the MS recording the PLMN number of the access network and the access technology identifier which are forbidden to access in the list of forbidden PLMNs and access technology identifiers further includes:

the MS analyzes the reason value in the Location Updating Reject Message after receiving the Location Updating Reject message from the MSC/SGSN, if the reason value is "current access technology of PLMN is not permitted", the MS records the PLMN number of the access network that the MS is located currently, and the access technology identifier in the list of forbidden PLMNs and access technology identifiers. If the reason value is "PLMN is not permitted", it is indicated that all the access technologies in the access network represented by the PLMN number are not permitted to access. Under such circumstances, the MS records the PLMN number in the list of forbidden PLMNs and access technology identifiers. All the access technology identifiers corresponding to the PLMN number in the list are set as 1, which is used for indicating that any type of access network is forbidden to access to the PLMN network;

The content of the list of forbidden PLMNs and access technology identifiers also can be modified, and the modification is implemented as follows:

if the MS successfully access to a certain PLMN network through one access technology in a manual PLMN network selection mode, the MS determines whether the PLMN number of the accessed network and corresponding access technology identifier exist in the list of forbidden PLMNs and access technology identifiers saved by the MS. If they exist in the list, the MS sets the bit corresponding to the access technology in the access technology identifier corresponding to the PLMN number as 0, so as to delete the access technology identifier from the list of forbidden PLMNs and access technology identifiers. After setting the bit as 0, the MS checks whether all the bits of each byte in the access technology identifier corresponding to the PLMN number are 0. If they are all 0, it indicates that all the access technologies corresponding to the PLMN number are all access technologies permitted to access, therefore deleting the PLMN number and the corresponding access technology identifiers, i.e. one group of the access restriction rule data of 5-byte, from the list of forbidden PLMNs and access technology identifiers; otherwise, this group of access restriction rule data can be reserved.

The above-mentioned embodiments are only embodiments for implementing the access restriction in the GSM network and the WCDMA network. The present invention also can be applied to other networks such as WLAN Bluetooth, etc., corresponding implementation is similar to those mentioned above.

The above-mentioned embodiments are only the preferred embodiments of the present invention, and not used to confine the protection scope of the present invention, it is apparent that various changes, substitution of equivalent parts and improvements can be made within the scope of the present invention as defined by the appended claims.

The invention claimed is:

1. A method for implementing access restriction of mobile networks, comprising the steps of:
    a Mobile Station (MS) inquiring a list of forbidden Public Land Mobile Networks (PLMNs) and access technology identifiers, which is saved by the MS, when the MS selects a PLMN network;
    the MS determining whether the selected PLMN network and the access technology exist in the list of forbidden PLMNs and access technology identifiers, if they exist, the MS not sending a Location Updating Request to a Mobile Switching Center/Serving GPRS Support Node (MSC/SGSN) of a Core Network; otherwise, the MS sending the Location Updating Request to the MSC/SGSN in order to access to the network;
    modifying the content of the list of forbidden PLMNs and access technology identifiers, wherein the modifying comprises:
        if the MS successfully accesses a certain PLMN network through an access technology, the MS determining whether the PLMN number of the accessed network and corresponding access technology identifier exist in the list of forbidden PLMNs and access technology identifiers saved by the MS; if the PLMN number and the corresponding access technology identifier exist in the list, the MS deleting the access technology identifier corresponding to the PLMN number from the list.

2. The method according to claim 1, further comprising the step of:
    generating the list of forbidden PLMNs and access technology identifiers; wherein the generating comprises:
        the MS sending a Location Updating Request to the MSC/SGSN;
        the MS receiving a Location Updating Reject Message which is returned by the MSC/SGSN if the MSC/SGSN determines that a subscriber of the MS is not to permit to access to the network through the access network, wherein the Location Updating Reject message comprises a reason value of the not permission;
        the MS recording the PLMN number of the access network and the access technology identifier which are forbidden to access in the list of forbidden PLMNs and access technology identifiers according to the reason value in the Location Updating Reject message.

3. The method according to claim 2, wherein the step of the MS recording the PLMN number of the access network and the access technology identifier which are forbidden to access in the list of forbidden PLMNs and access technology identifiers further comprises:
    the MS analyzing the reason value in the Location Updating Reject Message, and recording the PLMN number of the access network that the MS is located currently and the access technology identifier in the forbidden list of PLMNs and access technology identifiers if the reason value is "current access technology of PLMN is not permitted"; the MS recording the PLMN number and all the access technology identifiers in the list of forbidden PLMNs and access technology identifiers if the reason value is "PLMN is not permitted".

4. The method according to claim 1, wherein the list of forbidden PLMNs and access technology identifiers comprises:
    at least one group of access restriction rule data, wherein, each group of the access restriction rule data has five bytes, the first three bytes are used for storing the PLMN numbers, and the fourth and the fifth bytes are respectively used for storing the access technology identifiers.

5. The method according to claim 4, wherein one bit in each the fourth byte and the fifth byte represents one kind of access technology, with value 0 representing the access technology is permitted to access, or 1 representing the access technology is forbidden to access.

6. The method according to claim 5, further comprising:
    recording the access technology identifier in the list by setting the bit representing the access technology as 1; or
    deleting the access technology identifier from the list by setting the bit representing the access technology as 0.

7. The method according to claim 1, wherein the list of forbidden PLMNs and access technology identifiers comprises:
    at least one group of access restriction rule data, wherein each group of the access restriction rule data has five bytes, the first three bytes are used for storing the PLMN numbers, and the fourth and the fifth bytes are respectively used for storing the access technology identifiers.

8. The method according to claim 7, wherein one bit in each the fourth byte and the fifth byte represents one kind of access technology, with value 0 representing the access technology is permitted to access, or 1 representing the access technology is forbidden to access.

9. The method according to claim 8, further comprising:
    recording the access technology identifier in the list by setting the bit representing the access technology as 1; or deleting the access technology identifier from the list by setting the bit representing the access technology as 0.

10. The method according to claim 1, wherein the PLMN network is a Global System of Mobile (GSM) network, a Wideband Code Division Multiple Access (WCDMA) network, a Wireless Local Area Network (WLAN) or a Bluetooth network, or a combination thereof.

11. A method performed by a mobile station, the method comprising:
   when selecting a mobile network to access, checking whether the selected mobile network and a corresponding access technology are not permitted for the mobile station to access by inquiring a list stored in the mobile station, the stored list identifying access technologies and mobile networks to which the mobile station is not allowed to access; and
   if the selected mobile network and corresponding access technology are not permitted for the mobile station, determining not to send a location update request to a core network associated with the selected network; or
   if the selected network or the access technology is permitted for the mobile station to access, sending a location update request for access the selected network, the location update request being sent to the core network,
   wherein the list comprises at least one group of access restriction rule data, each access restriction rule data group comprising a network number and at least one access technology identifier associated with the network number for indicating that a network identified by the network number is not allowed for the mobile station to access via a access technology identified by said access technology identifier, wherein the group of access restriction rule data occupy a plurality of bytes, wherein at least one of the plurality bytes are used to store the network number and at least one of the other bytes are used for storing the access technology identifier.

12. The method of claim 11, further comprising:
   updating, by the mobile station, the stored list, wherein the updating comprises:
      if the mobile station successfully accesses a certain mobile network via an access technology, checking whether the successfully accessed network and the access technology are identified by the list as not permitted for the mobile station; and
      if the PLMN network and the access technology are identified by the list as not permitted for the mobile station, deleting access technology identifier of the access technology from the list.

13. The method of claim 11, wherein the list stored at the mobile station is generated by the mobile station according to information received from the core network, the information being sent by the core network upon determining that the mobile station is restricted from accessing a certain network via a certain access technology associated with said network, the information indicating whether said network and/or said access technology is not permitted for the mobile station.

14. The method of claim 13, wherein the generating comprises:
   if the information indicates that said access technology is not permitted for the mobile station, recording the access technology identifier of said access technology and the network number corresponding to said network in the list; or
   if the information indicating that said network is not permitted for the mobile station, recording the network number of said not permitted network and all the access technology identifiers corresponding to said not permitted network.

* * * * *